United States Patent [19]

Erdmannsdörfer

[11] 4,198,217

[45] Apr. 15, 1980

[54] PROTECTIVE AIR FILTER INTAKE HOOD WITH AIR DEFLECTING INTAKE SCREEN

[75] Inventor: Hans Erdmannsdörfer, Ludwigsburg, Fed. Rep. of Germany

[73] Assignee: Filterwerk Mann & Hummel GmbH, Ludwigsburg, Fed. Rep. of Germany

[21] Appl. No.: 937,190

[22] Filed: Aug. 28, 1978

[30] Foreign Application Priority Data

Sep. 10, 1977 [DE] Fed. Rep. of Germany ....... 7728139

[51] Int. Cl.² .................................. B01D 45/06
[52] U.S. Cl. .................. 55/385 F; 55/457; 55/DIG. 37; 180/54 A; 180/69.01; 160/19; 98/115 R
[58] Field of Search ............... 55/337, 342, 385 B, 55/385 F, 456, 457, DIG. 28, DIG. 37, 442, 443; 98/211, 115 R; 180/54 A, 69.01; 160/19

[56] References Cited

U.S. PATENT DOCUMENTS

| | | | |
|---|---|---|---|
| 1,641,746 | 9/1927 | Donaldson | 55/457 |
| 1,729,390 | 9/1929 | Kamrath | 55/457 |
| 1,734,030 | 11/1929 | Bennett | 55/457 |
| 2,962,122 | 11/1960 | Linderoth | 55/442 |
| 3,190,058 | 6/1965 | Farr et al. | 55/442 |
| 3,378,994 | 4/1968 | Farr | 55/443 |
| 3,737,002 | 6/1973 | Yotsomoto | 55/385 B |
| 3,791,112 | 2/1974 | Lidstone | 55/385 B |

*Primary Examiner*—David L. Lacey
*Attorney, Agent, or Firm*—Joseph A. Geiger

[57] ABSTRACT

A protective air filter intake hood with an air deflecting intake screen for internal combustion engines and other air-aspirating machinery, the protective screen which covers the air intake opening having a series of slats forming intake flow gaps inclined at an acute angle to a horizontal vector line, so as to force the intake air to execute a change in flow direction of more than 180 degrees, in order to enter the intake duct, thereby ejecting heavier-than-air matter from the intake air.

6 Claims, 5 Drawing Figures

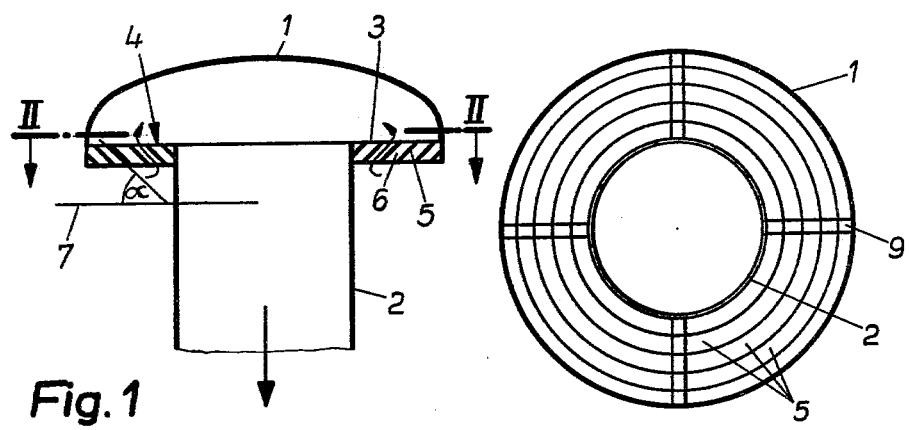
Fig. 1
Fig. 2
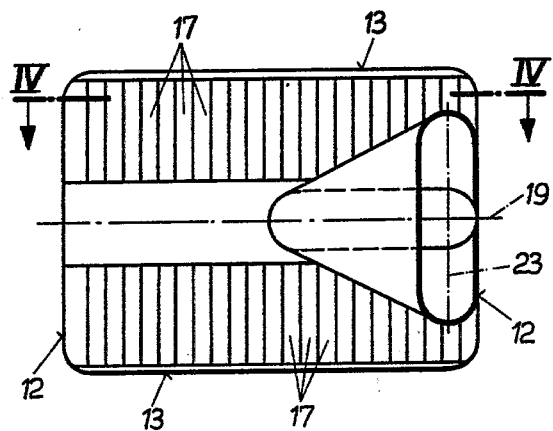
Fig. 3
Fig. 5
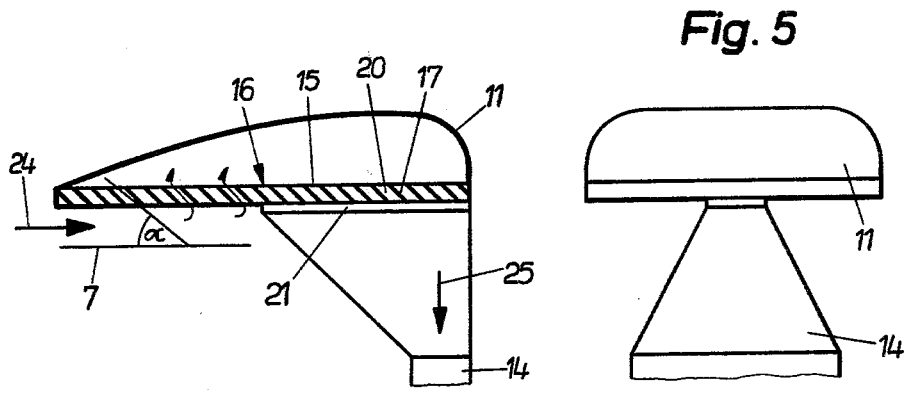
Fig. 4

PROTECTIVE AIR FILTER INTAKE HOOD WITH AIR DEFLECTING INTAKE SCREEN

BACKGROUND OF THE INVENTION

1. Field of the Invention

The present invention relates to air filtering and air intake devices, and, more particularly, to a protective intake hood for air filters of internal combustion engines, compressors, and other air-aspirating machinery.

2. Description of the Prior Art

It is known to arrange on the intake opening of air filters for internal combustion engines, compressors, and other air-aspirating machinery a protective intake hood which admits the air through an intake opening which is arranged on the underside of the hood, adjacent to a vertically oriented intake duct, and that the air intake opening is covered by a horizontal or slightly inclined protective screen. The protective screens of these known air filter intake hoods consist of perforated sheet metal and/or wire mesh. Also known are protective screens of circular outline which consist of a plurality of radially extending fins.

The various known protective screens for air filter intake hoods, while providing a deflection of the incoming air into the intake duct by at most 180 degrees, may be capable of preventing large particles from entering the intake duct, as a result of their screening action. Smaller particles, however, can pass unimpeded through these protective screens. Likewise, there is no or only an inadequate separation of water, especially rain droplets, from the incoming air.

SUMMARY OF THE INVENTION

It is a primary objective of the present invention to suggest an improved protective air filter intake hood which, using simple means, produces a more efficient separation of heavier-than-air matter, thereby eliminating or diminishing the shortcomings of the prior art intake hoods described above.

The present invention proposes to attain this objective by suggesting a protective air filter intake hood for internal combustion engines, compressors, and other air-aspirating machinery which is characterized in that the protective screen serves as an air deflecting structure, having a plurality of parallel oriented slats which form air intake gaps between them, for a flow direction between the slats which is inclined from the horizontal direction by an acute angle, in such a way that the air which is drawn through the screen is forced to change its flow direction by more than 180 degrees, in order to enter the vertical air intake duct.

The proposed improved protective air filter intake hood has shown to be particularly effective in the separation of rain water from the intake air. The deflection of the intake air over more than 180 degrees thus makes it possible to greatly increase the separating efficiency of the intake hood, while the concomitant increase in flow resistance has remained negligible.

In the case of a protective air intake hood which is mounted on a vehicle, the present invention makes it possible to take advantage of the slip stream created by the movement of the vehicle, inasmuch as the invention suggests, in a preferred embodiment, that the air intake hood be provided with a protective screen of elongated outline to which the intake duct is connected at the center of the rearward narrow side, and that the slats of the protective screen be oriented transversely to the longitudinal axis of the screen, the latter pointing in the direction of vehicle movement.

For above-canopy air intakes of commercial vehicles, the invention suggests a particularly advantageous protective intake hood featuring a protective screen of rectangular outline, with rows of transverse slats arranged on both longitudinal sides, the adjacent connection to the intake duct having an upper intake duct cross section which is oblong in the direction of the longitudinal axis of the protective screen, with a transition, in the downstream direction, to an oblong duct cross section which is rotated 90 degrees from the upper cross section, or to a circular duct cross section of at least approximately identical circumferential length.

BRIEF DESCRIPTION OF THE DRAWINGS

Further special features and advantages of the invention will become apparent from the description following below, when taken together with the accompanying drawing which illustrates, by way of example, two embodiments of the invention, represented in the various figures as follows:

FIG. 1 shows, in an elevational cross section, a protective air filter intake hood and intake duct embodying the invention;

FIG. 2 shows the intake hood and intake duct of FIG. 1, in a cross section along line II—II of FIG. 1;

FIG. 3 shows a second embodiment of the invention, as seen from below;

FIG. 4 shows a longitudinal cross section through the embodiment of FIG. 3, taken along line IV—IV thereof; and FIG. 5 shows the embodiment of FIGS. 3 and 4, as seen from the front.

DESCRIPTION OF THE PREFERRED EMBODIMENTS

In the embodiment of FIGS. 1 and 2, the protective air filter intake hood 1 has connected thereto a vertically oriented intake duct 2, leading downwardly to an air-aspirating machine (not shown), such as an internal combustion engine, compressor, or the like. The annular intake opening 3, defined between the rim of the intake hood 1 and the upper opening of the intake duct 2 is covered by a horizontally oriented protective screen 4.

The protective screen 4 is in the form of an air deflecting screen, having a series of concentrically arranged lamellae-like slats 5 supported on four radial ribs 9, the slats 5 defining narrow air intake gaps 6 between them. The slats 5 are inclined with respect to a horizontal line, so as to enclose an acute angle $\alpha$ with a horizontal vector. This signifies that, as shown by the arrows in FIG. 1, the air flowing through the intake gaps 6 is forced to change its flow direction by more than 180 degrees in order to enter the air intake duct 2.

The modified embodiment of FIGS. 3, 4, and 5 is particularly advantageous for applications in connection with commercial vehicles, where the air intake is arranged above the level of the vehicle canopy. As can be seen in FIG. 3, the protective air intake hood 11 has a rectangular plan view outline, with front and rear narrow sides 12 and lateral longitudinal sides 13. In the center portion of one of the narrow sides 12 is arranged the opening for a downwardly extending intake duct 14. The air intake opening 15 on the underside of the rectangular hood 11 is covered by a protective screen which again, features an air deflecting structure. For this purpose, the protective screen has arranged along both longitudinal sides 13 a series of slats 17 which extend transversely to the longitudinal axis 19 of the screen 16.

As is shown in FIG. 4, the slats 17 of the protective screen 16 again define an acute angle $\alpha$ with respect to a horizontal line, in this case, the forward direction of vehicle travel, for example. As in the previously described embodiment, the air which is drawn into the intake duct 14, across the intake gaps 20 of the protective screen 16, is forced to change its flow direction by more than 180 degrees, in order to enter the intake duct 14.

The upper opening 21 of the intake duct 14 adjacent to the protective screen 16 has preferably an oblong cross section, in alignment with the longitudinal axis 19 of the protective screen 16. In the downstream direction 25 of the incoming air, the oblong cross section of the duct 14 undergoes a transition to an oblong cross section which is rotated 90 degrees from the upper opening 21, meaning that the longitudinal axis 23 of the lower duct cross section extends transversely to the longitudinal axis 19 of the protective screen 16, as can be seen in FIG. 3. The circumferential length of the oblong cross sections of the upper and lower openings of the intake duct 14 are preferably the same. The protective air filter intake hood 11 of the embodiment of FIGS. 3 through 5 is preferably so oriented that its longitudinal axis 19 extends in the direction of forward movement of the vehicle, so that the slip stream created by the traveling vehicle moves in the direction of the arrow 24.

It should be understood, of course, that the foregoing disclosure describes only preferred embodiments of the invention and that it is intended to cover all changes and modifications of these examples of the invention which fall within the scope of the appended claims.

I claim the following:

1. A protective hood assembly for air intake systems, especially air intake filters of such air-aspirating machinery as internal combustion engines, air compressors, and the like, comprising in combination:
   a substantially vertically oriented intake duct which is open on both ends, for a downward flow of air through the duct;
   an upwardly domed hood arranged above the upper end of the intake duct, the hood having a peripheral edge defining the outermost and lowermost extent of the hood, said edge being located at approximately the same level as the upper end of the intake duct and circumscribing an area which is considerably larger than the cross-sectional area of the intake duct at its upper end, thereby forming a downwardly oriented air intake opening adjacent to the upper end of the air intake duct; and
   a substantially horizontally oriented screen covering the air intake opening between the intake duct and the hood, while supporting the hood, the screen having its inner and outer peripheries attached to the intake duct and to the hood, respectively; and wherein
   the screen has a series of parallel oriented lamellae-like slats forming air flow gaps therebetween; and
   the slats of the screen are inclined from the vertical direction, so that the direction of air flow in said gaps is upward and outward, away from the intake duct, thereby forcing the incoming air to execute a change in flow direction of more than 180 degrees between the screen and the upper opening of the intake duct.

2. A protective hood assembly as defined in claim 1, wherein
   both the hood and the air intake duct are circular in outline and arranged concentrically to one another, thus defining an annular air intake opening;
   the screen has a matching annular outline; and
   the slats of the screen are in the form of concentrically arranged annular members which are supported by radial ribs extending across the air intake opening.

3. A protective hood assembly as defined in claim 1, wherein
   the peripheral edge of the hood and the attached outer periphery of the screen have an oblong outline;
   the position of the hood above the intake duct is laterally offset in the direction of the long axis of said oblong outline, so that the major portion of the air intake opening and screen is shifted to one side of the intake duct; and
   the slats of the screen are straight and run transversely to said long axis, their inclination from the vertical direction being such that the outward component of the air flow between the slats has substantially the same direction as said lateral offset of the head.

4. A protective hood assembly as defined in claim 3, wherein
   the hood and screen have a substantially rectangular outer outline; and
   the slats of the screen are arranged in two separate parallel rows of slats adjacent to the long sides of the screen outline, the screen having a gap-free wall portion covering the central space between the two rows of slats.

5. A protective hood assembly as defined in claim 3 or claim 4, wherein
   the upper end of the intake duct and the inner periphery of the screen have a common oblong outline with a long axis that coincides with the longitudinal center line of the rectangular outline of the screen, the upper end of the intake duct fitting laterally between the two rows of slats in the screen;
   a lower portion of the intake duct is circular in outline; and
   the duct includes a transition portion between its upper end and said lower duct portion in which the outline changes from oblong to round.

6. A protective hood assembly as defined in claim 3 of claim 4, wherein
   the upper end of the intake duct and the inner periphery of the screen have a common oblong outline with a long axis that coincides with the longitudinal center line of the rectangular outline of the screen, the upper end of the intake duct fitting laterally between the two rows of slats in the screen;
   a lower portion of the intake duct has an oblong outline with a long axis that is perpendicular to the long axis of the screen outline; and
   the duct includes a transition portion between its upper end and said lower duct portion in which the outline changes from longitudinally oblong to transversely oblong.

* * * * *